United States Patent
Lozinsky et al.

(10) Patent No.: US 10,365,082 B2
(45) Date of Patent: Jul. 30, 2019

(54) ANGULAR POSITION SENSOR WITH MAGNETOMETER

(75) Inventors: Clint P. Lozinsky, Edmonton (CA); Jonathan P. Zacharko, Edmonton (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/366,077

(22) PCT Filed: Jul. 2, 2012

(86) PCT No.: PCT/US2012/045231
§ 371 (c)(1),
(2), (4) Date: Jun. 17, 2014

(87) PCT Pub. No.: WO2014/007796
PCT Pub. Date: Jan. 9, 2014

(65) Prior Publication Data
US 2014/0333310 A1    Nov. 13, 2014

(51) Int. Cl.
*G01B 7/14* (2006.01)
*E21B 47/024* (2006.01)
(Continued)

(52) U.S. Cl.
CPC .............. *G01B 7/14* (2013.01); *E21B 47/011* (2013.01); *E21B 47/024* (2013.01); *E21B 47/02216* (2013.01); *G01V 3/08* (2013.01)

(58) Field of Classification Search
None
See application file for complete search history.

(56) References Cited

U.S. PATENT DOCUMENTS 3,369,174 A * 2/1968 Groenendyke .......... G01V 3/26
324/340
3,965,753 A    6/1976 Browning, Jr.
(Continued)

FOREIGN PATENT DOCUMENTS

CN    101713287    5/2010
GB    2179455    3/1987
(Continued)

OTHER PUBLICATIONS

Anonymous, "Magnetic Sensor Products: HMC/HMR Series," Brochure, Honeywell Inc., retrieved May 22, 2012: pp. 1-4.
(Continued)

*Primary Examiner* — Douglas X Rodriguez
(74) *Attorney, Agent, or Firm* — Chamberlain Hrdlicka

(57) ABSTRACT

An angular position sensor can include a magnetic device from which a magnetic field emanates, and multiple magnetometers, whereby each magnetometer senses a varying strength of the magnetic field due to relative rotation between components of a well tool. A method of determining an azimuthal position of a shaft which rotates relative to an outer housing can include securing a selected one of at least one magnetic device and at least one magnetometer to the shaft, securing the other of the magnetic device and the magnetometer to the outer housing, a fluid motor rotating the shaft relative to the outer housing in the well, and the magnetometer sensing a varying strength of a magnetic field emanating from the magnetic device as the shaft rotates relative to the housing.

19 Claims, 5 Drawing Sheets

(51) Int. Cl.
*G01V 3/08* (2006.01)
*E21B 47/01* (2012.01)
*E21B 47/022* (2012.01)

(56) References Cited

U.S. PATENT DOCUMENTS

| | | | |
|---|---|---|---|
| 4,323,848 A * | 4/1982 | Kuckes | G01V 3/26 |
| | | | 324/247 |
| 4,613,816 A | 9/1986 | Zeamer | |
| 4,845,434 A * | 7/1989 | Kuckes | G01V 3/24 |
| | | | 166/66.5 |
| 5,163,521 A | 11/1992 | Pustanyk et al. | |
| 5,410,303 A * | 4/1995 | Comeau | E21B 7/04 |
| | | | 175/40 |
| 5,568,048 A | 10/1996 | Schroeder et al. | |
| 6,433,536 B1 | 8/2002 | Yundt et al. | |
| 7,212,132 B2 * | 5/2007 | Gao | G01V 11/002 |
| | | | 324/326 |
| 7,556,105 B2 | 7/2009 | Krueger | |
| 2004/0100252 A1 * | 5/2004 | Babin | G01D 5/145 |
| | | | 324/207.25 |
| 2005/0189946 A1 | 9/2005 | Moore | |
| 2008/0035376 A1 | 2/2008 | Freyer | |
| 2008/0284440 A1 | 11/2008 | Moore | |
| 2008/0294344 A1 | 11/2008 | Suguira | |
| 2009/0030615 A1 * | 1/2009 | Clark | E21B 47/02216 |
| | | | 702/7 |
| 2010/0308113 A1 * | 12/2010 | Momose | G07D 7/04 |
| | | | 235/450 |
| 2011/0232917 A1 | 9/2011 | Skinner et al. | |
| 2012/0067644 A1 * | 3/2012 | Goswami | E21B 47/02216 |
| | | | 175/45 |
| 2013/0319659 A1 * | 12/2013 | Freedman | E21B 7/04 |
| | | | 166/250.01 |

FOREIGN PATENT DOCUMENTS

| | | | |
|---|---|---|---|
| WO | 2011016803 | 2/2011 | |
| WO | WO 2011016803 A1 * | 2/2011 | E21B 7/067 |

OTHER PUBLICATIONS

Anonymous, "Hall effect sensor," Wikipedia, Nov. 21, 2011: pp. 1-3, <http://en.wikipedia.org/wiki/Hall_effect_sensor>.
Anonymous, "Hall Effect Transducers (HET)," GP5200 RPM Sensor, retrieved Dec. 17, 2011: pp. 1.
Anonymous, "Magnetometer," Wikipedia, Nov. 21, 2011: pp. 1-15, <http://en.wikipedia.org/wiki/Magnetometer>.
Anonymous, "Resolver (electrical)," Wikipedia, Nov. 21, 2011: pp. 1-3, <http://en.wikipedia.org/wiki/Resolver_(electrical)>.
Anonymous, "Rotary encoder," Wikipedia, Nov. 21, 2011: pp. 1-8, <http://en.wikipedia.org/wiki/Rotary_encoder#Optical_absolute_encoders>.
Janisch, "Sensors: Position/Presence/Proximity Understanding Integrated Hall Effect Rotary Encoders," Questex Media Group LLC, Sensorsmag, Nov. 1, 2006: pp. 1-3, <http://www.sensorsmag.com/sensors/position-presence-proximity/understanding-integrated-hall-effect-rotary-encoders-1254?print=1>.

* cited by examiner

ANGULAR POSITION SENSOR WITH MAGNETOMETER

CROSS-REFERENCE TO RELATED APPLICATION

This application is a national stage under 35 USC 371 of International Application No. PCT/US12/45231, filed on 2 Jul. 2012. The entire disclosure of this prior application is incorporated herein by this reference.

TECHNICAL FIELD

This disclosure relates generally to equipment utilized and operations performed in conjunction with a subterranean well and, in one example described below, more particularly provides a well tool with an angular position sensor comprising one or more magnetometers.

BACKGROUND

It is frequently desirable to be able to determine an angular position of one element relative to another in a well. For example, in well drilling operations, it can be useful to determine an angular position of an internal component of a rotary steerable drilling tool.

It will, therefore, be appreciated that improvements in the art of angular position determination are continually needed.

DETAILED DESCRIPTION

Figure 1:
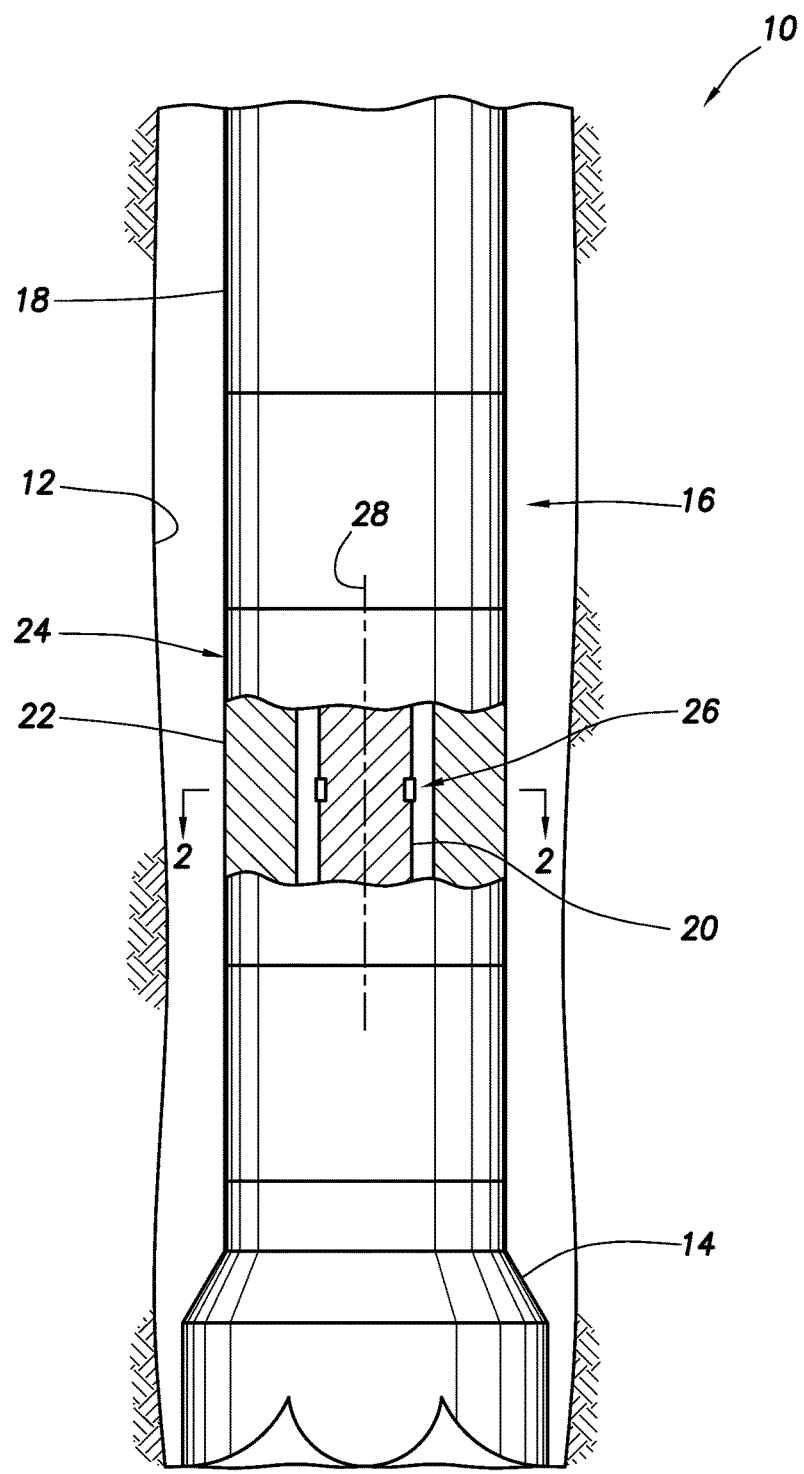
FIG. 1 is a representative partially cross-sectional view of a well system and associated method which can embody principles of this disclosure.

Representatively illustrated in FIG. 1 is a system 10 for use with a subterranean well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a wellbore 12 is drilled by rotating a drill bit 14 connected at a distal end of a drill string 16. The drill bit 14 is rotated, in this example, by means of a fluid motor 18 interconnected in the drill string 16.

The fluid motor 18 (commonly referred to as a "mud" motor) could be a positive displacement Moineau-type drilling motor, or it could be a turbine-type drilling motor. Other types of fluid motors may be used, or no fluid motor may be used, in keeping with the scope of this disclosure.

The fluid motor 18 rotates a shaft 20 relative to an outer housing 22 containing the shaft. The shaft 20 is connected to the drill bit 14, so that the drill bit rotates with the shaft to drill the wellbore 12.

Note that the outer housing 22 could also rotate in the wellbore 12, while the shaft 20 rotates relative to the housing. In other examples, the drill string 16 could be rotated and/or the outer housing 22 could be rotated to cause the drill bit 14 to drill the wellbore 12.

In still further examples, a drilling operation may not be performed. For example, the principles of this disclosure could be applied in other types of operations (such as, completion, stimulation, conformance or production operations).

As depicted in the FIG. 1 example, a well tool 24 is interconnected in the drill string 16, so that the shaft 20 extends through the well tool. The well tool 24 could be a rotary steerable drilling tool of the type used in directional drilling. However, the well tool 24 could be another type of well tool (whether used for drilling or not) in keeping with the principles of this disclosure.

An angular position sensor 26 is contained in the well tool 24. The sensor 26 is used to determine an azimuthal orientation of the shaft 20 relative to the outer housing 22 (that is, an angular position about a longitudinal axis 28 of the housing).

It is not necessary for the well tool 24 to be a separate component of the drill string 16. For example, the well tool 24 could be integrated with the fluid motor 18 or another component of the drill string 16 (such as, a constant velocity joint housing, a bearing assembly, etc.). Thus, it should be understood that the scope of this disclosure is not limited at all to any of the details of the system 10, drill string 16, well tool 24 or sensor 26 as depicted in the drawings or described herein.

Figure 2:
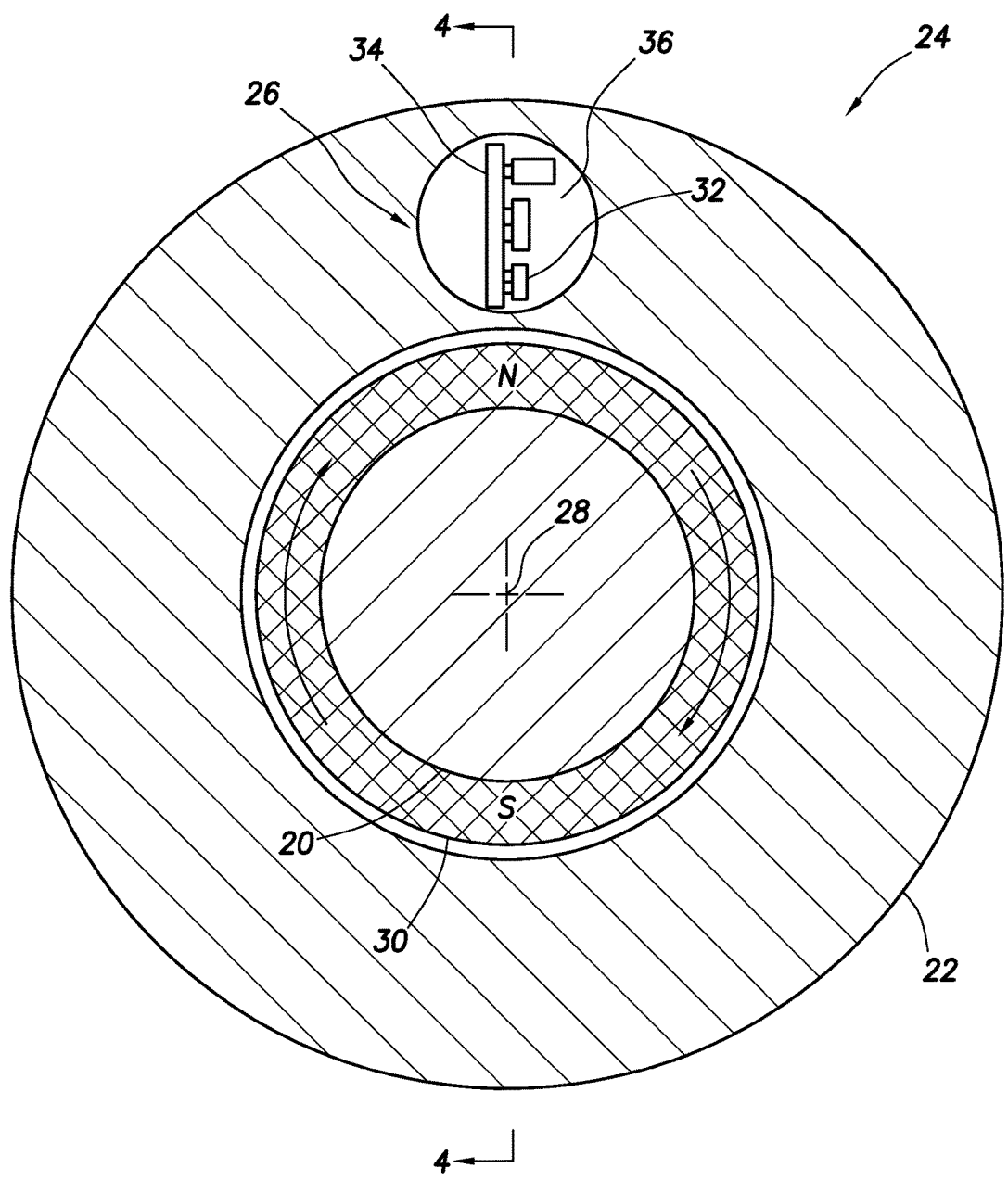
FIG. 2 is a representative cross-sectional view, taken along line 2-2 of FIG. 1, of a well tool which can embody principles of this disclosure.

Referring additionally now to FIG. 2, a cross-sectional view of one example of the well tool 24 is representatively illustrated. The well tool 24 may be used in the system 10 and drill string 16 of FIG. 1, or it may be used in other systems or drill strings.

In the FIG. 2 example, a magnetic device 30 is attached to the shaft 20, so that it rotates with the shaft. The magnetic device 30 comprises a permanent magnet in the shape of a ring. The magnetic device 30 has North and South poles which are on opposite sides of the shaft 20.

A magnetometer 32 is attached to a structure, such as a circuit board 34, positioned in a gas-filled chamber 36. In some examples, the chamber 36 is filled with air at or near atmospheric pressure, although the pressure may increase due to a temperature increase experienced by the well tool 24 downhole.

In other examples, the chamber 36 could be partially or completely filled with another gas (e.g., an inert gas, such as nitrogen or argon, etc.) at an elevated pressure. Any gas or pressure may be used in the chamber 36, in keeping with the scope of this disclosure.

In other examples, the magnetometer 32 could be surrounded by a gel or solid substance (such as, a potting compound, resin, etc.), or a relatively inert liquid (such as silicone oil). Any manner of positioning and securing the magnetometer 32 may be used, in keeping with the scope of this disclosure.

The magnetometer 32 is positioned so that it is able to sense a strength of a magnetic field emanating from the magnetic device 30. For example, a magnetic field strength sensitive axis of the magnetometer 32 can be aligned with a North-South axis of the magnetic device 30, as depicted in FIG. 2, so that a maximum magnetic field strength is detected when these axes are aligned.

One suitable magnetometer which may be used in the sensor 26 is an HCM1021 magneto-resistive sensor marketed by Honeywell Sensing and Control of Golden Valley, Minn. USA. However, other magnetometers, and other types of magnetometers, may be used and remain within the scope of this disclosure.

As will be appreciated by those skilled in the art, with the shaft 20 rotating as shown in FIG. 2, a maximum positive magnetic field strength will be detected when the North pole is proximate the magnetometer 32, and a minimum (or maximum negative) magnetic field strength will be detected when the South pole is proximate the magnetometer. No magnetic field strength will be detected when the poles are 90 degrees offset from these positions.

However, stray or ambient magnetic fields can offset these magnetic field strength values. A technique described below can calculate the azimuthal position of the shaft 20 relative to the housing 22, even if the magnetic field strengths as measured by the magnetometer 32 are offset.

A curve representing the magnetic field strength detected by the magnetometer 32 will be sinusoidal in form between the maximums and minimums, when the shaft 20 rotates relative to the outer housing 22. A frequency of this sinusoidal curve will be related to a rotational speed of the shaft 20 relative to the housing 22.

In other examples, the outer housing 22 could rotate in the wellbore 12, while the shaft 20 remains stationary, or while the shaft rotates relative to the outer housing. In further examples, the magnetic device 30 could be secured to the housing 22, and the magnetometer 32 could rotate with the shaft 20. As another alternative, one or more magnetic devices 30 and/or magnetometers 32 could be secured to either or both of the shaft 20 and housing 22. Thus, it should be clearly understood that the scope of this disclosure is not limited at all to any of the details of the well tool 24 and angular position sensor 26 as depicted in the drawings or as described herein.

Figure 3:
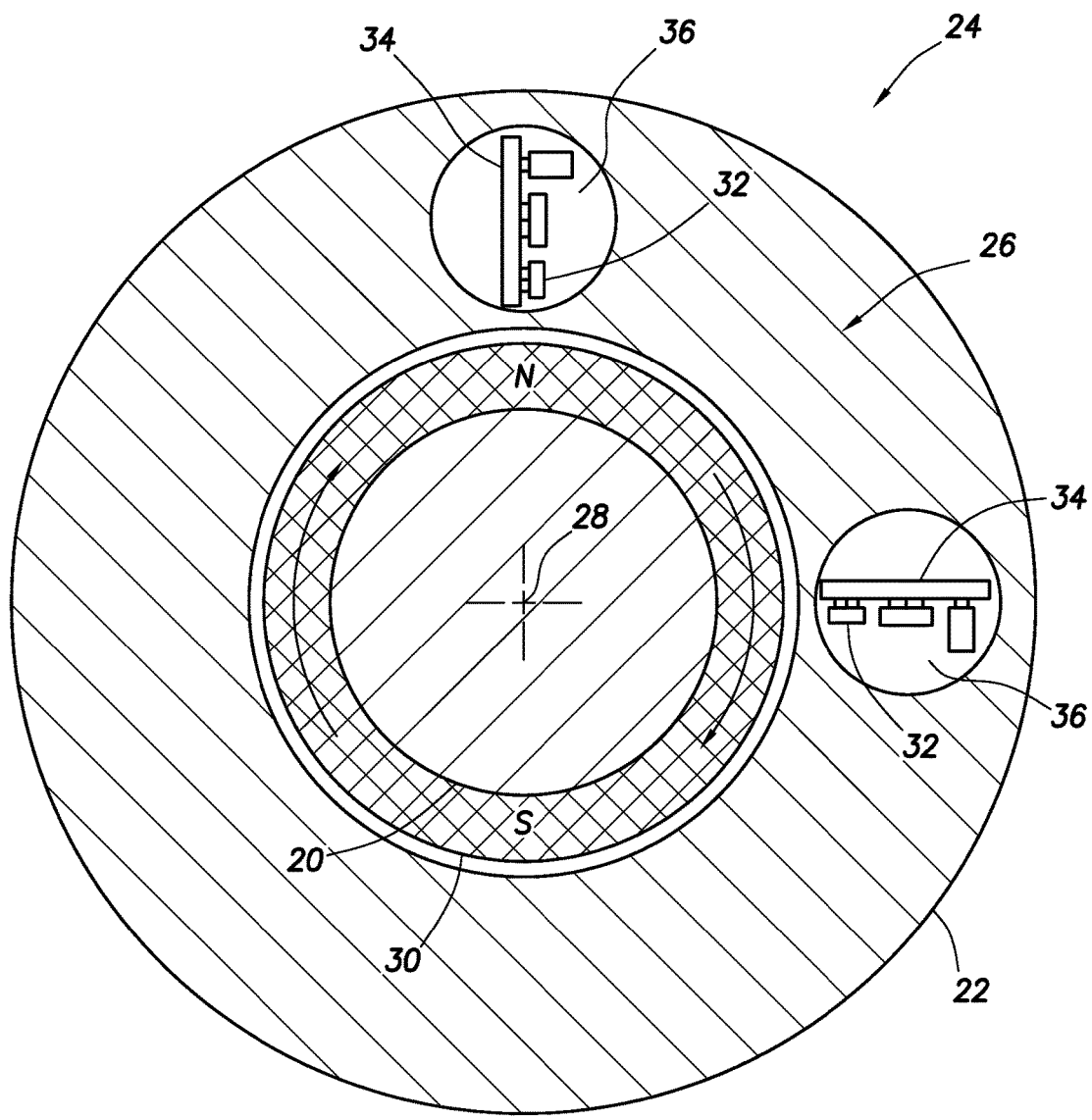
FIG. 3 is a representative cross-sectional view of another example of the well tool.

Referring additionally now to FIG. 3, another example of the well tool 24 is representatively illustrated. In this example, two of the magnetometers 32 are used to sense the rotational orientation of the magnetic device 30 relative to the outer housing 22. Any number of magnetometers 32 may be used, in keeping with the scope of this disclosure.

By sensing the magnetic field strength at different azimuthal positions, respective different sinusoidal curves are output by the magnetometers (as long as the magnetometers are not positioned 180 degrees from each other). These different curves can be analyzed to determine a precise azimuthal position of the shaft 20 relative to the outer housing 22 at any time. By comparing the azimuthal positions at different times, a rotational velocity and acceleration of the shaft 20 relative to the housing 22 can be readily determined.

In the FIG. 3 example, the magnetometers are azimuthally offset by 90 degrees. However, in other examples, the magnetometers could be azimuthally offset by other amounts.

Figure 4:
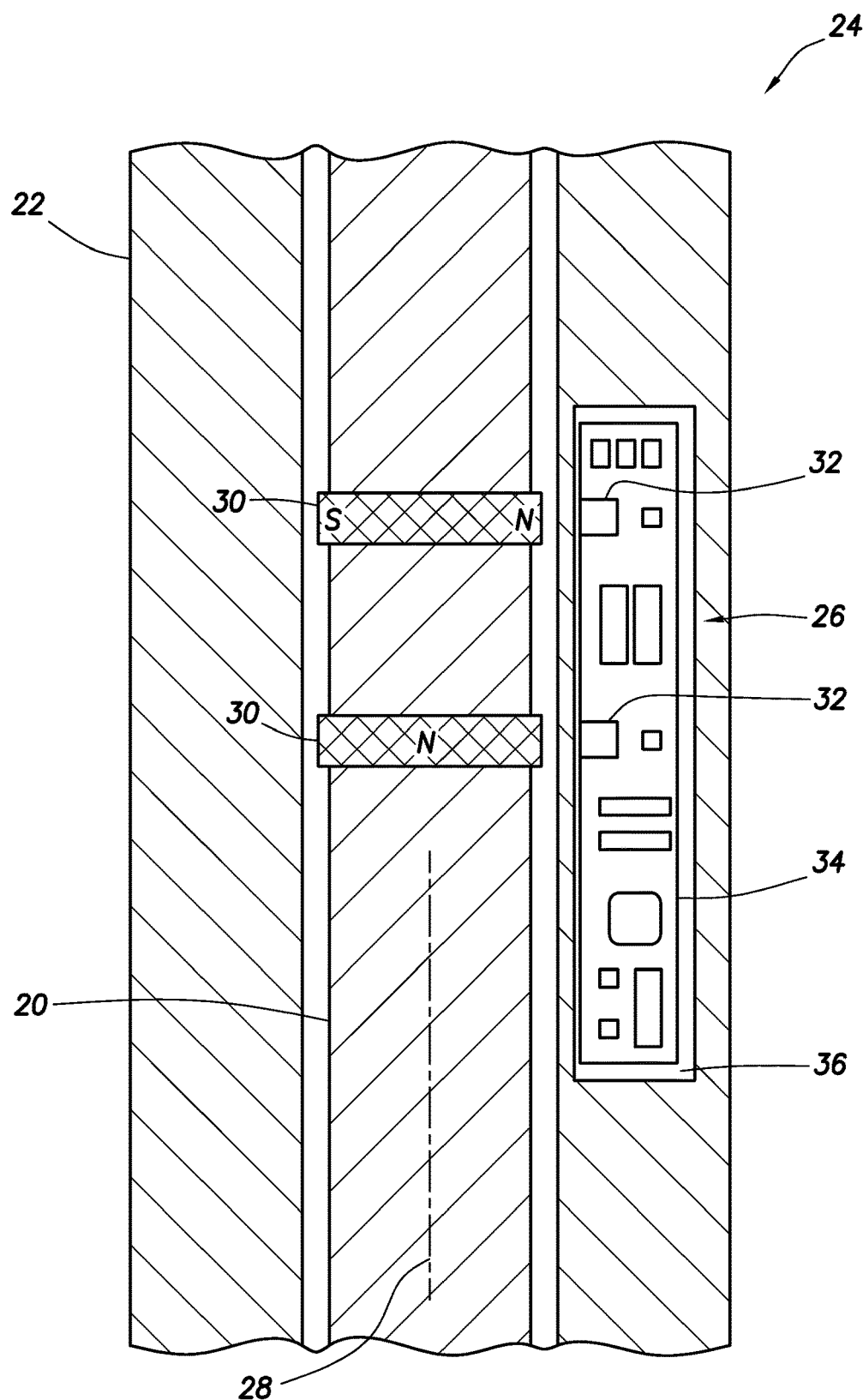
FIG. 4 is a representative cross-sectional view of yet another example of the well tool, taken along line 4-4 of FIG. 2.

Referring additionally now to FIG. 4, yet another example of the well tool 24 is representatively illustrated. In this example, multiple magnetometers 32 are used (as in the FIG. 3 example), but the magnetometers are not azimuthally offset relative to one another. Instead, the magnetometers 32 in the FIG. 4 example are azimuthally aligned, but are longitudinally offset.

In addition, multiple magnetic devices 30 are attached to the shaft 20. Each of the magnetic devices 30 is longitudinally aligned with one of the magnetometers 32, so that each magnetometer senses a varying magnetic field strength emanating from a respective one of the magnetic devices, as the shaft 20 rotates relative to the housing 22.

In the FIG. 4 example, the magnetometers 32 are azimuthally aligned, but the magnetic devices 30 are azimuthally offset. In this manner, the magnetic field strength curves output by the magnetometers 32 will be different, with a phase offset corresponding to the azimuthal offset between the magnetic devices 30. This phase offset allows the exact azimuthal position of the shaft 20 relative to the outer housing 22 to be readily determined, as described more fully below.

The magnetic devices 30 are azimuthally offset by 90 degrees in the FIG. 4 example. However, in other examples the magnetic devices 30 could be azimuthally offset by other amounts.

A similar result could be obtained by azimuthally aligning the magnetic devices 30 and azimuthally offsetting the magnetometers 32 (somewhat like the example of FIG. 3, but with multiple longitudinally offset magnetic devices and magnetometers). The configuration of FIG. 4 may be preferred if it is desired for the multiple magnetometers 32 to be positioned in the same chamber 36, for example, to reduce manufacturing costs, reduce sealing requirements, etc. The configuration of FIG. 3 may be preferred if a reduced length of the well tool 24 is desired.

However, it should be clearly understood that any configuration of the well tool 24 or sensor 26 may be used, in keeping with the scope of this disclosure. For example, in the FIGS. 3 & 4 configurations, one or more magnetic devices 30 and/or magnetometers 32 could be secured to either or both of the shaft 20 and housing 22.

Figure 5:
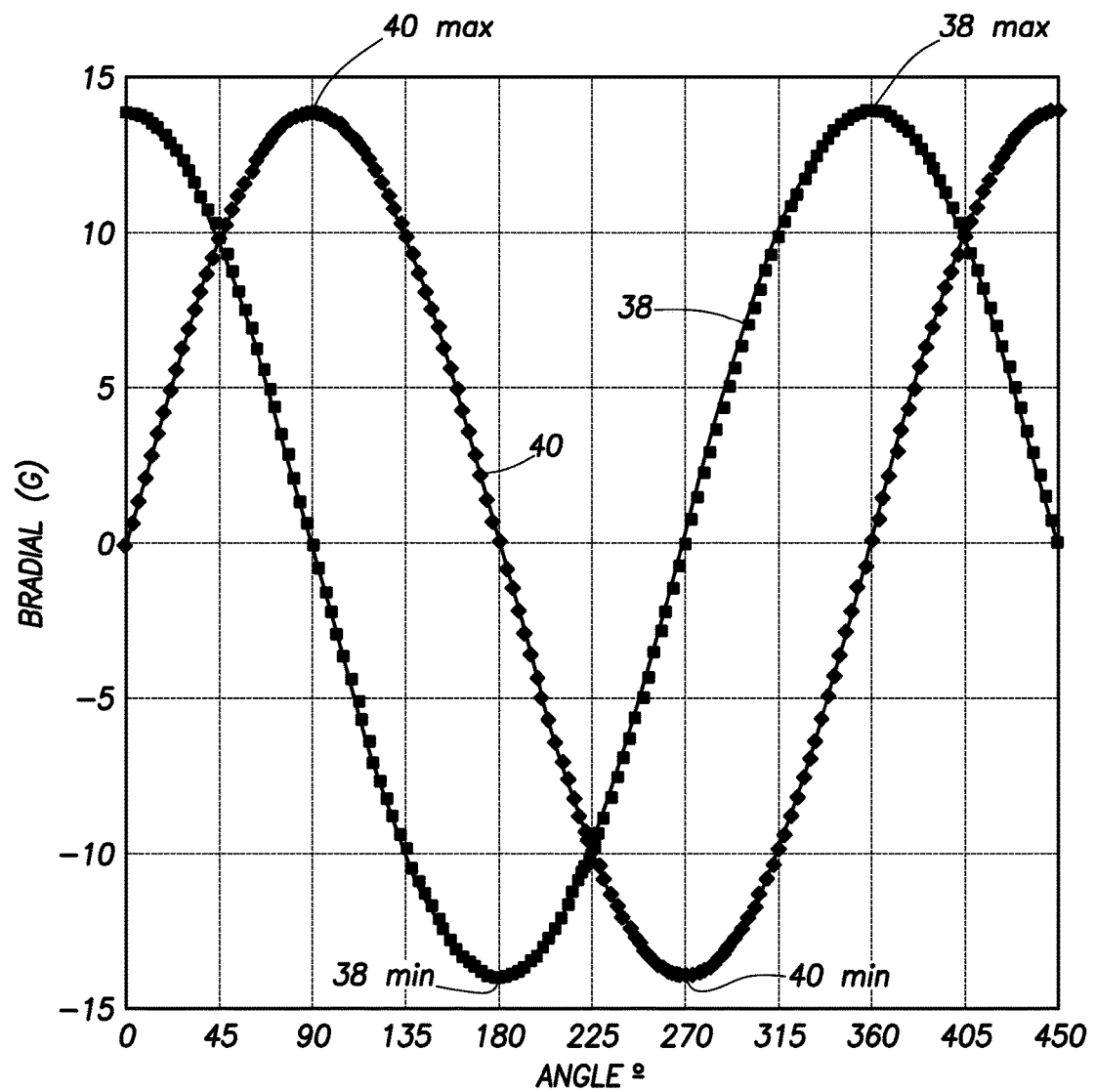
FIG. 5 is a representative graph of magnetic field strength measurements taken by magnetometers of an angular position sensor which can embody principles of this disclosure.

Referring additionally now to FIG. 5, a graph of magnetic field strength curves 38, 40 output by the magnetometers 32 is representatively illustrated. The vertical axis represents magnetic field strength in Gauss, and the horizontal axis represents azimuthal position in degrees.

The curves 38, 40 repeat every 360 degrees. A phase offset between the curves 38, 40 (90 degrees, in this example) corresponds to an azimuthal offset between the magnetometers 32 (as in the FIG. 3 example), or corresponds to an azimuthal offset between the magnetic devices 30 (as in the FIG. 4 example).

Note that the combination of the curves 38, 40 is unique at each azimuthal position. This allows the azimuthal position to be determined based on the combined outputs of the magnetometers 32.

For example, if the shaft 20 has been rotated at least one full rotation (360 degrees) relative to the housing 22, so that maximum and minimum magnetic field strength values have been sensed by each of the magnetometers 32, then an azimuthal position of the shaft relative to the housing can be determined as follows:

Assume that the magnetometer 32 which outputs the curve 38 senses a maximum (38max) and a minimum (38min) during the rotation of the shaft 20, and the other magnetometer which outputs the curve 40 senses a maximum (40max) and a minimum (40min) during the shaft rotation.

Offsets and a ratio for use in conveniently comparing the curves 38, 40 can be computed as follows:

$$38\text{offset} = (38\text{max} + 38\text{min})/2 \quad (1)$$

$$40\text{offset} = (40\text{max} + 40\text{min})/2 \quad (2)$$

$$38/40\text{ratio} = (38\text{max} - 38\text{min})/(40\text{max} - 40\text{min}) \quad (3)$$

The offsets 38offset and 40offset can be useful in correcting for stray or ambient magnetic fields. For example, stray or slow moving magnetic fields could be due to the earth's magnetic field, slight magnetization of the surrounding well tool 24, the formation or casing, etc.

The azimuthal position can then be computed if corresponding values along the curves 38, 40 are known (that is, if the outputs of the magnetometers 32 are known at any point in time). The following equation computes a relative angle between the shaft 20 and the housing 22 (with 38sensed and 40sensed being values along the curves 38, 40 at a particular point in time):

$$\text{angle} = a\tan((40\text{sensed} - 40\text{offset})*38/40\text{ratio} - (38\text{sensed} - 38\text{offset})) \quad (4)$$

The angle computed above will be in the range of −90 degrees to +90 degrees. If 38sensed and 40sensed are both greater than zero, then the azimuthal position of the shaft 20 relative to the housing 22 corresponds to the computed angle. If 38sensed is less than zero and 40sensed is greater than zero, then the azimuthal position of the shaft 20 relative to the housing 22 corresponds to the computed angle +180 degrees. If 38sensed and 40sensed are both less than zero, then the azimuthal position of the shaft 20 relative to the housing 22 corresponds to the computed angle +180 degrees. If 38sensed is less greater zero and 40sensed is less than zero, then the azimuthal position of the shaft 20 relative to the housing 22 corresponds to the computed angle +360 degrees. Of course, any other technique for calculating the azimuthal position may be used, in keeping with the scope of this disclosure.

Thus, the azimuthal position of the shaft 20 relative to the housing 22 can be determined from the different outputs of the multiple magnetometers 32. The azimuthal position of the shaft 20 relative to the housing 22 can be determined whether the shaft is or is not rotating relative to the housing, and whether the housing is or is not rotating relative to the wellbore 12. It is not necessary for the shaft 20 to rotate in order for its azimuthal position relative to the housing 22 to be determined (after the maximums and minimums of the curves 38, 40 have been determined). This "static" azimuthal orientation determining may be useful, for example, while taking a downhole sensor survey.

Although the magnetic devices 30 in some examples described above can comprise permanent magnets, it will be appreciated that other types of magnetic devices (such as, electromagnets, magnetostrictive elements, etc.) may be used to produce steady state or varying magnetic fields. Thus, it should be clearly understood that any type of magnetic device(s) may be used, in keeping with the principles of this disclosure.

It may now be fully appreciated that the above disclosure provides significant advancements to the art of angular position sensing in subterranean wells. In some examples described above, the sensor 26 can be used to determine a unique azimuthal orientation of the shaft 20 relative to the housing 22 using multiple magnetometers 32. One or more of these magnetometers 32 can be contained in the gas-filled chamber 36, which should enhance a capability of the magnetometers to withstand a harsh downhole environment (typically with extremes of temperature and pressure).

An angular position sensor 26 for use in a subterranean well is described above. In one example, the sensor 26 comprises at least one magnetic device 30 from which at least one magnetic field emanates, and multiple magnetometers 32. Each magnetometer 32 senses a varying strength of the magnetic field due to relative rotation between a shaft 20 and an outer housing 22 in the well.

The magnetic device 30 may be secured to one of the shaft 20 and the outer housing 22, and the magnetometers 32 may be secured to the other of the shaft 20 and the outer housing 22. The magnetometers 32 can be positioned in a gas-filled chamber 36 in the well. However, it is not necessary for the magnetometers 32 to be positioned in a pressure isolated chamber.

The shaft 20 may be rotated by a fluid motor 18. Rotation of the shaft 20 may also rotate a drill bit 14.

The magnetic device 30 can comprise a permanent magnet, which may be in the shape of a magnetic ring.

The at least one magnetic device 30 may comprise multiple magnetic devices 30 which are azimuthally offset relative to each other. In this example, the magnetometers 32 can sense the varying strength of the respective magnetic fields which emanate from the respective magnetic devices 30. The multiple magnetometers 32 may be positioned in a same gas-filled chamber 36 in the well.

The magnetometers 32 may be azimuthally offset relative to each other. In this example, the magnetometers 32 can sense the varying strength of the magnetic field which emanates from the same magnetic device 30.

Also described above is a method of determining an azimuthal position of a shaft 20 which rotates relative to an outer housing 22 in a subterranean well. In one example, the method can include securing a selected one of at least one magnetic device 30 and at least one magnetometer 32 to the shaft 20; securing the other of the magnetic device 30 and the magnetometer 32 to the outer housing 22; a fluid motor 18 rotating the shaft 20 relative to the outer housing 22 in the well; and the magnetometer 32 sensing a varying strength of a magnetic field emanating from the magnetic device 30 as the shaft 20 rotates relative to the outer housing 22.

A well tool 24 for use in a subterranean well is also described above. In one example, the well tool 24 can include a shaft 20 rotatable relative to an outer housing 22 in the well, at least one magnetic device 30 from which a magnetic field emanates (the magnetic device 30 being secured to one of the shaft 20 and the outer housing 22), and at least one magnetometer 32 which senses a varying strength of the magnetic field due to relative rotation between the shaft 20 and the outer housing 22. The magnetometer 32 is secured to the other of the shaft 20 and the outer housing 22.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used.

Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. An angular position sensor for use with a well tool comprising a shaft rotatable within an outer housing in a subterranean well, the sensor comprising:
    a first magnetic device, from which a first magnetic field emanates, the first magnetic device rotatable with the shaft to vary the first magnetic field with respect to the outer housing;
    a second magnetic device longitudinally and azimuthally offset with respect to the first magnetic device, from which a second magnetic field emanates, the second magnetic device rotatable with the shaft to vary the second magnetic field with respect to the outer housing and each of the first and second magnetic devices comprises a magnetic ring extending along a circumference of the shaft and having a single north pole and a single south pole, the poles being on opposite sides of the shaft; and
    magnetometers associated with each of the magnetic devices and configured to sense the associated varying magnetic field, wherein the magnetometers are longitudinally offset from each other in the outer housing.

2. The sensor of claim 1, wherein the magnetic devices are secured to the shaft and the magnetometers are secured to the outer housing.

3. The sensor of claim 1, wherein the magnetometers are in a pressure-isolated chamber located in the outer housing and the chamber is filled with at least one of a gas, a liquid, and a solid substance.

4. The sensor of claim 1, wherein the shaft is rotatable by a fluid motor.

5. The sensor of claim 1, wherein rotation of the shaft also rotates a drill bit.

6. The sensor of claim 1, wherein each of the magnetic devices comprises a permanent magnet.

7. The sensor of claim 1, wherein the magnetometers are azimuthally aligned relative to each other.

8. The sensor of claim 1, wherein the magnetometers are azimuthally offset relative to each other.

9. A method of determining an azimuthal position of a shaft which rotates within an outer housing in a subterranean well, the method comprising:
    securing magnetic devices to the shaft longitudinally and azimuthally offset from one another, each magnetic device comprising a magnetic ring extending along a circumference of the shaft and having a north pole and a south pole on opposite sides of the shaft;
    securing the magnetometers associated with each of the magnetic devices to the outer housing;
    rotating the shaft relative to the outer housing in the well; and
    sensing a varying magnetic field emanating from the magnetic devices using the associated magnetometers as the shaft rotates relative to the outer housing, wherein the magnetometers are longitudinally offset from each other in the outer housing.

10. The method of claim 9, wherein the magnetometers are in a pressure-isolated chamber located in the outer housing and further comprising filling the chamber with at least one of a gas, a liquid, and a solid substance.

11. The method of claim 9, wherein rotation of the shaft also rotates a drill bit.

12. The method of claim 9, wherein each of the magnetic devices comprises a permanent magnet.

13. A well tool for use in a subterranean well, the well tool comprising:
    a shaft rotatable within an outer housing;
    a first magnetic device from which a first magnetic field emanates, the first magnetic device being secured to and rotatable with the shaft to vary the first magnetic field with respect to the outer housing;
    a second magnetic device longitudinally and azimuthally offset with respect to the first magnetic device, from which a second magnetic field emanates, the second magnetic device rotatable with the shaft to vary the second magnetic field with respect to the outer housing and each of the first and second magnetic devices comprising a magnetic ring extending along a circumference of the shaft and having a north pole and a south pole on opposite sides of the shaft; and
    magnetometers associated with each of the magnetic devices and configured to sense the associated varying magnetic field, the magnetometers being secured to the outer housing, the magnetometers being longitudinally offset from each other in a pressure-isolated chamber located in the outer housing.

14. The well tool of claim 13, wherein the chamber is filled with at least one of a gas, a liquid, and a solid substance.

15. The well tool of claim 13, wherein the shaft is rotatable by a fluid motor.

16. The well tool of claim 13, wherein rotation of the shaft also rotates a drill bit.

17. The well tool of claim 13, wherein each of the magnetic devices comprises a permanent magnet.

18. The well tool of claim 13, wherein the magnetometers are azimuthally aligned relative to each other.

19. The well tool of claim 13, wherein the magnetometers are azimuthally offset relative to each other.

* * * * *